US012731033B2

(12) United States Patent
Yanagisawa et al.

(10) Patent No.: US 12,731,033 B2
(45) Date of Patent: Sep. 8, 2026

(54) NON-LINEAR LATTICE LAYER FOR PARTIALLY MONOTONIC NEURAL NETWORK

(71) Applicant: INTERNATIONAL BUSINESS MACHINES CORPORATION, Armonk, NY (US)

(72) Inventors: Hiroki Yanagisawa, Kawasaki (JP); Kohei Miyaguchi, Tokyo (JP); Takayuki Katsuki, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 1082 days.

(21) Appl. No.: 17/502,118

(22) Filed: Oct. 15, 2021

(65) Prior Publication Data

US 2023/0127410 A1 Apr. 27, 2023

(51) Int. Cl.
*G06N 3/082* (2023.01)
*G06F 18/20* (2023.01)
*G06N 3/04* (2023.01)

(52) U.S. Cl.
CPC ............. *G06N 3/082* (2013.01); *G06F 18/29* (2023.01); *G06N 3/04* (2013.01)

(58) Field of Classification Search
CPC .................................. G06N 3/08; G06N 3/04
See application file for complete search history.

(56) References Cited

U.S. PATENT DOCUMENTS

2020/0401894 A1 12/2020 Turner et al.
2021/0073642 A1* 3/2021 Dribus .................... G06N 3/04
2021/0319272 A1 10/2021 Gaidon et al.
2021/0383189 A1 12/2021 Cong et al.

FOREIGN PATENT DOCUMENTS

WO 2023/062475 A1 4/2023

OTHER PUBLICATIONS

You, Seungil, et al. "Deep lattice networks and partial monotonic functions." Advances in neural information processing systems 30 (2017). (Year: 2017).*

(Continued)

*Primary Examiner* — Kevin W Figueroa
(74) *Attorney, Agent, or Firm* — CHIP LAW GROUP

(57) ABSTRACT

A computer-implemented method for training a lattice layer in a Deep Lattice Network includes preparing parameters of vertices, each of the parameters corresponding to each vertex of a subdivided unit hypercube defined by subdividing an S-dimensional unit hypercube by a predetermined number k with $k^S$ vertices and defining each parameter by identifying one vertex in a specific order, identifying a first set of vertices that appear before the identified vertex in the specific order, identifying a second set of vertices that appear before the identified vertex in the specific order, defining a lower bound as a maximum value among values of vertices in the first set of vertices, defining an upper bound as a minimum value among values of vertices in the second set of vertices, and defining the parameter of the identified vertex based on the lower bound, the upper bound, and a parameter corresponding to the identified vertex.

25 Claims, 10 Drawing Sheets

(56) References Cited

OTHER PUBLICATIONS

International Search Report from PCT/IB2022/059401 dated Dec. 16, 2022. (6 pages).
You et al., "Deep Lattice Networks and Partial Monotonic Functions", 31st Conference on Neural Information Processing Systems (NIPS 2017), arXiv: 1709.06680v1 [stat.ML] Sep. 19, 2017, pp. 1-9.
Liu et al., "Certified Monotonic Neural Networks", 34th Conference on Neural Information Processing Systems (NeurIPS 2020), arXiv:2011.10219v1 [cs.LG] Nov. 20, 2020, pp. 1-16.
Daniels et al., "Monotone and Partially Monotone Neural Networks", IEEE Transactions On Neural Networks, vol. 21, No. 6, Jun. 2010, pp. 1-12.
Morioka et al., "Monotonic Kronecker-Factored Lattice", In International Conference on Learning Representations, Sep. 2, 20208, pp. 1-16.
Trindade et al., "Partially Monotonic Learning for Neural Networks", 2021, pp. 1-12.
Wang et al., "Deontological Ethics By Monotonicity Shape Constraints", Proceedings of the 23rdInternational Conference on Artificial Intelligence and Statistics (AISTATS), Jun. 3, 2020, pp. 1-11.

* cited by examiner

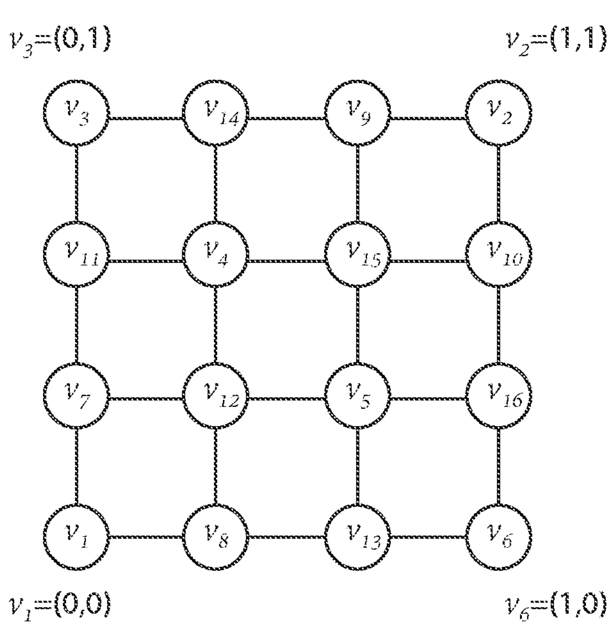
FIG. 4
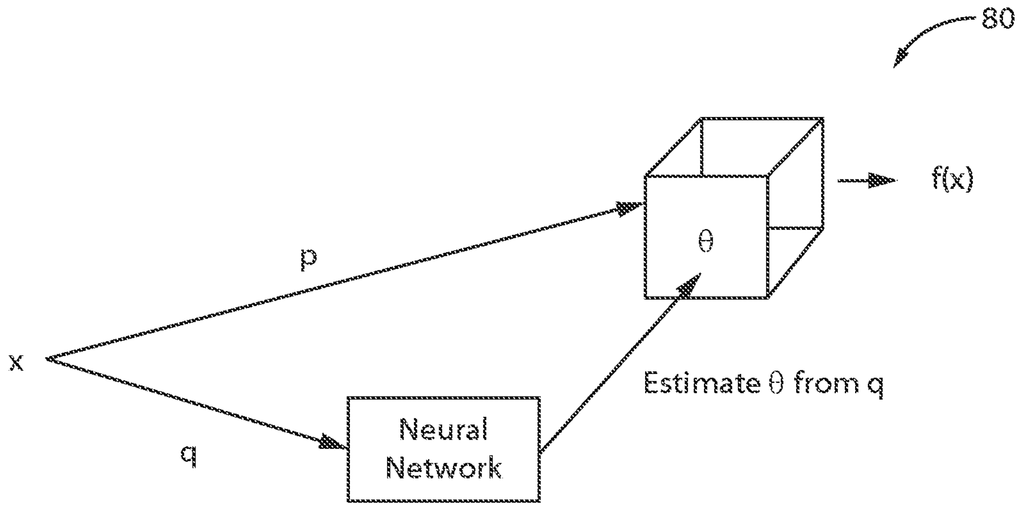
FIG. 5

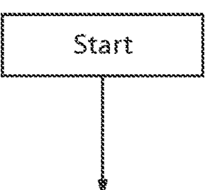

Prepare parameters θ of the vertices, each of the parameters corresponding to each vertex of a subdivided unit hypercube which is defined by subdividing a α-dimensional unit hypercube by a predetermined number k with $k^{\alpha}$ vertices

100

Wherein the procedure to define the parameter includes:

(a) identifying one vertex in a specific order (b) identifying a first set of vertices that appear before the identified vertex in the specific order and are dominated by the identified vertex with regards to each coordinate of the identified vertex (c) identifying a second set of vertices that appear before the identified vertex in the specific order and are dominating the identified vertex with regards to each coordinate of the identified vertex (d) Defining a lower bound as a maximum value among values of vertices in the first set (e) Defining an upper bound as a minimum value among values of vertices in the second set (f) Defining the parameter of the identified vertex based on the lower bound, upper bound and a parameter corresponding to the identified vertex so that the parameter represents a relative location of the identified vertex in an interval between the lower bound and the upper bound; and (g) Repeating steps (a) - (f) until all of the parameters of the vertices are defined.

102

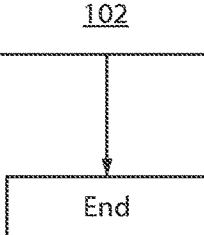

FIG. 6

Figure 7:
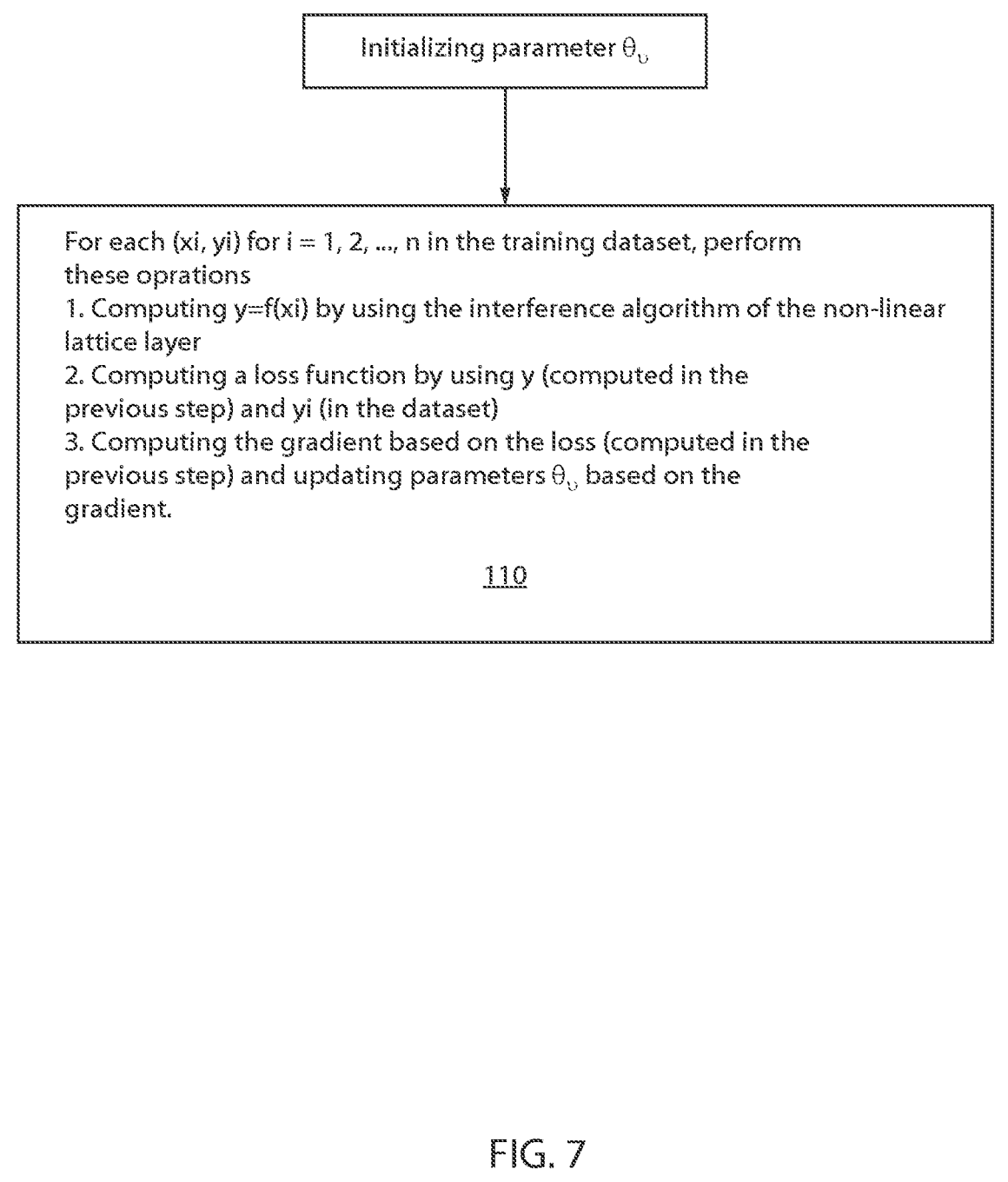

Initializing parameter $\theta_\upsilon$

For each (xi, yi) for i = 1, 2, ..., n in the training dataset, perform these oprations
1. Computing y=f(xi) by using the interference algorithm of the non-linear lattice layer
2. Computing a loss function by using y (computed in the previous step) and yi (in the dataset)
3. Computing the gradient based on the loss (computed in the previous step) and updating parameters $\theta_\upsilon$ based on the gradient.

NON-LINEAR LATTICE LAYER FOR PARTIALLY MONOTONIC NEURAL NETWORK

BACKGROUND

The present invention relates generally to machine learning, and more specifically, to methods and systems for a non-linear lattice layer for a partially monotonic neural network.

When a regression is used, there is prior knowledge that the output is monotonically increasing (or decreasing) with respect to some subsets of input features. To exploit this knowledge, several neural networks have been proposed for partially monotonic regression.

SUMMARY

In accordance with an embodiment, a computer-implemented method for training a lattice layer in a Deep Lattice Network (DLN) to infer a real-value output from an S-dimensional input having a monotonic-relationship with the output is provided. In this summary, it is assumed that the output is monotonically increasing with respect to all the dimensions of input for simplicity. (A more general case that the output is monotonically increasing to a part of the inputs is described later on.) The computer-implemented method includes preparing parameters θ of vertices, each of parameter corresponding to each vertex of a subdivided unit hypercube defined by subdividing an S-dimensional unit hypercube by a predetermined number k with $k^S$ vertices and defining each parameter θ by identifying one vertex in a specific order, identifying a first set of vertices that appear before the identified vertex in the specific order and are dominated by the identified vertex with regards to each coordinate of the identified vertex, identifying a second set of vertices that appear before the identified vertex in the specific order and are dominating the identified vertex with regards to each coordinate of the identified vertex, defining a lower bound as a maximum value among values of vertices in the first set of vertices, defining an upper bound as a minimum value among values of vertices in the second set of vertices, and defining the parameter of the identified vertex based on the lower bound, the upper bound, and a parameter corresponding to the identified vertex so that the parameter represents a relative location of the identified vertex in an interval between the lower bound and the upper bound.

In accordance with another embodiment, a computer program product for training a lattice layer in a Deep Lattice Network (DLN) to infer a real-value output from an S-dimensional input having a monotonic-relationship with the output is provided. The computer program product includes a computer readable storage medium having program instructions embodied therewith, the program instructions executable by a computer to cause the computer to prepare parameters θ of vertices, each of the parameters corresponding to each vertex of a subdivided unit hypercube defined by subdividing an S-dimensional unit hypercube by a predetermined number k with $k^S$ vertices and define each parameter θ by identifying one vertex in a specific order, identifying a first set of vertices that appear before the identified vertex in the specific order and are dominated by the identified vertex with regards to each coordinate of the identified vertex, identifying a second set of vertices that appear before the identified vertex in the specific order and are dominating the identified vertex with regards to each coordinate of the identified vertex, defining a lower bound as a maximum value among values of vertices in the first set of vertices, defining an upper bound as a minimum value among values of vertices in the second set of vertices, and defining the parameter of the identified vertex based on the lower bound, the upper bound, and a parameter corresponding to the identified vertex so that the parameter represents a relative location of the identified vertex in an interval between the lower bound and the upper bound.

In accordance with yet another embodiment, a system for training a lattice layer in a Deep Lattice Network (DLN) to infer a real-value output from an S-dimensional input having a monotonic-relationship with the output is provided. The system includes a memory and one or more processors in communication with the memory configured to prepare parameters θ of vertices, each of the parameters corresponding to each vertex of a subdivided unit hypercube defined by subdividing an S-dimensional unit hypercube by a predetermined number k with k vertices and define each parameter θ by identifying one vertex in a specific order, identifying a first set of vertices that appear before the identified vertex in the specific order and are dominated by the identified vertex with regards to each coordinate of the identified vertex, identifying a second set of vertices that appear before the identified vertex in the specific order and are dominating the identified vertex with regards to each coordinate of the identified vertex, defining a lower bound as a maximum value among values of vertices in the first set of vertices, defining an upper bound as a minimum value among values of vertices in the second set of vertices, and defining the parameter of the identified vertex based on the lower bound, the upper bound, and a parameter corresponding to the identified vertex so that the parameter represents a relative location of the identified vertex in an interval between the lower bound and the upper bound.

In accordance with another embodiment, a computer-implemented method for training a lattice layer in a Deep Lattice Network (DLN) is provided. The computer-implemented method includes creating a non-linear lattice layer for the DLN, the non-linear lattice layer including an S-dimensional unit hypercube decomposed into (k−1)×(k−1)× . . . ×(k−1) sub-hypercubes by dividing an interval [0, 1] of each dimension into k−1 subintervals and preparing parameters θ of vertices, each of the parameters corresponding to each vertex of the S-dimensional unit hypercube.

In accordance with yet another embodiment, a computer program product for training a lattice layer in a Deep Lattice Network (DLN) is provided. The computer program product includes a computer readable storage medium having program instructions embodied therewith, the program instructions executable by a computer to cause the computer to create a non-linear lattice layer for the DLN, the non-linear lattice layer including an α-dimensional unit hypercube decomposed into (k−1)×(k−1)× . . . ×(k−1) sub-hypercubes by dividing an interval [0, 1] of each dimension into k−1 subintervals and prepare parameters θ of vertices, each of the parameters corresponding to each vertex of the S-dimensional unit hypercube.

It should be noted that the exemplary embodiments are described with reference to different subject-matters. In particular, some embodiments are described with reference to method type claims whereas other embodiments have been described with reference to apparatus type claims. However, a person skilled in the art will gather from the above and the following description that, unless otherwise notified, in addition to any combination of features belonging to one type of subject-matter, also any combination between features relating to different subject-matters, in particular, between features of the method type claims, and features of the apparatus type claims, is considered as to be described within this document.

These and other features and advantages will become apparent from the following detailed description of illustrative embodiments thereof, which is to be read in connection with the accompanying drawings.

BRIEF DESCRIPTION OF THE DRAWINGS

The invention will provide details in the following description of preferred embodiments with reference to the following figures wherein:

FIG. 4 illustrates an exemplary hypercube for the non-linear lattice layer (2D), in accordance with an embodiment of the present invention;

FIG. 5 illustrates an exemplary method to handle partial monotonicity, in accordance with an embodiment of the present invention;

FIG. 6 illustrates an exemplary method for employing a non-linear lattice layer for a partially monotonic neural network, in accordance with an embodiment of the present invention;

FIG. 7 illustrates an exemplary method for employing a training algorithm, in accordance with an embodiment of the present invention;

Throughout the drawings, same or similar reference numerals represent the same or similar elements.

DETAILED DESCRIPTION

Figure 1:
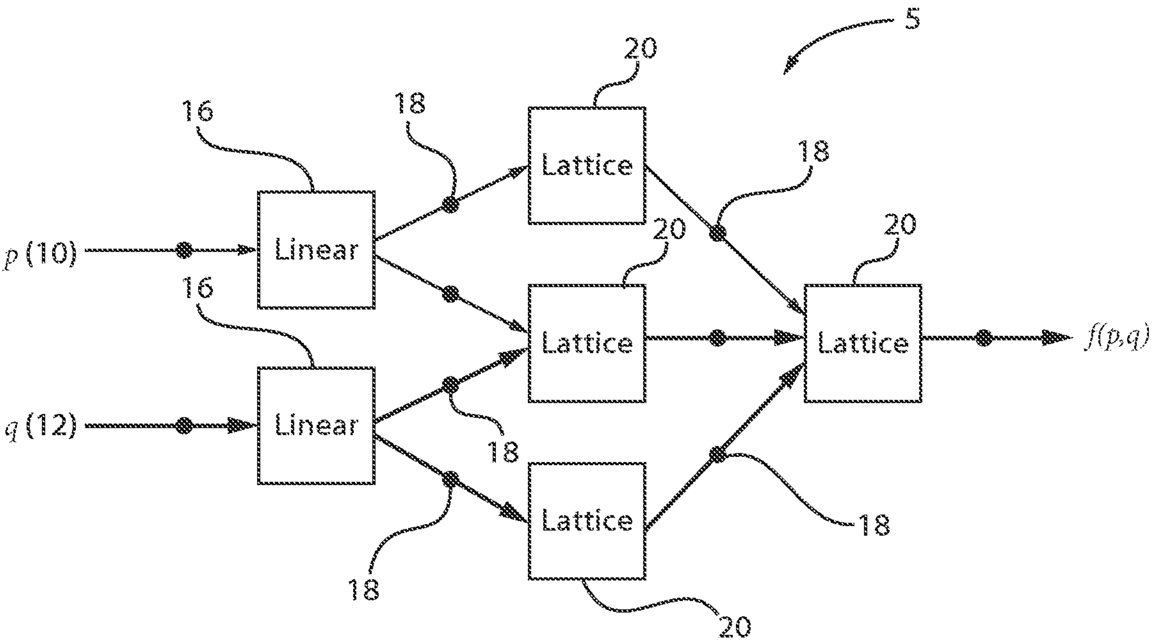
FIG. 1 is a block/flow diagram of a Deep Lattice Network (DLN) architecture, in accordance with an embodiment of the present invention.

Embodiments in accordance with the present invention provide methods and devices for employing an extension of the lattice layer to express the non-linear relationship between the input feature and the output. The lattice layer of the Deep Lattice Network (DLN) is replaced with a non-linear lattice layer capable of expressing such non-linear relationships.

When a regression is used, there is prior knowledge that the output is monotonically increasing (or decreasing) with respect to some subsets of input features. For example, when a house price is estimated from the inputs of various house data (e.g., the house price, the size of area, the number of rooms, the distance to the nearest supermarket, etc.), prior knowledge on the monotonicity between the output (house price) and some of the inputs (size of area) is provided.

To exploit this knowledge, several neural networks have been proposed for partially monotonic regression. These models have advantages over the standard regression model. For example, partially monotonic models have better regularization capability. In addition, partially monotone models can be used for fair machine learning. For example, when scores are assigned for job applicants based on their resume by using a regression model, the regression model can sometimes penalize job applicants with more job experience, which might come from overfitting of the model. A partially monotone regression model can avoid such unfair scoring.

DLN is a neural network model for employing partially monotonic regression. This neural network includes three types of layers, that is, the linear embedding layer, the lattice layer, and the calibration layer. These three layers can be combined to construct a large and complex neural network. To ensure end-to-end monotonicity, an output of a layer whose inputs include monotonic inputs must be used as a monotonic input for the next layer.

The exemplary embodiments introduce a non-linear lattice layer by extending the lattice layer in the DLN. The non-linear lattice layer can be seen as a combination of the lattice layer and the calibration layer of DLN. The exemplary embodiments divide the unit hypercube by subdividing all dimensions by k to obtain a hypercube with more detailed granularity (increasing the number of vertices from $2^S$ to $k^S$). This subdivision is similar to the calibration layer in DLN when S=1. A parameter $\theta_\nu$ is associated with each vertex v so that the $\theta_\nu$ is used to ensure (partial) monotonicity. The exemplary embodiments further use different parameterization for the new layer in contrast to the lattice layer in DLN. Moreover, contrary to the original lattice layer in DLN, the exemplary embodiments do not expect $\theta_\nu = f(v)$. The procedure to define the parameter $\theta_\nu$ for each vertex v is given by letting σ be an arbitrary ordering of the vertices included in the (subdivided) unit hypercube. For each vertex v (by the ordering σ), $L_{\nu,\sigma}$ is the set of vertices that appear before v in σ and are dominated by v, $U_{\nu,\sigma}$ is the set of vertices that appear before v in σ and are dominating v, lower bound is computed by $l=\max\{0, \max_{\nu' \in L_{\nu,\sigma}} f(v')\}$, upper bound is computed by $u=\min\{0, \min_{\nu' \in U_{\nu,\sigma}} f(v')\}$, and $\theta_\nu$ is defined to the value that satisfies $f(v)=(1-\theta_\nu)\,1+\theta_\nu\,u$. For each vertex v, the value f(v) can be computed by using the parameters $\theta_\nu$ by following the above procedure, assuming that the parameters $\theta_\nu$ are trained (e.g., determined by the training algorithm).

It is to be understood that the present invention will be described in terms of a given illustrative architecture; however, other architectures, structures, substrate materials and process features and steps/blocks can be varied within the scope of the present invention. It should be noted that certain features cannot be shown in all figures for the sake of clarity. This is not intended to be interpreted as a limitation of any particular embodiment, or illustration, or scope of the claims.

FIG. 1 is a block/flow diagram of a Deep Lattice Network (DLN) architecture, in accordance with an embodiment of the present invention.

The DLN 5 includes linear embedding layers 16, calibration layers 18, and lattice layers 20. The inputs 10, 12 are received by the linear embedding layers 16. The thick arrows represent monotonic inputs, and the regular arrows represent non-monotone inputs. To ensure end-to-end monotonicity, any layer which has a monotonic input (thick arrow) has the monotonic output.

The partially monotonic regression is considered by using a neural network. It is assumed that the input is S-dimensional feature vectors and that they can be partitioned into monotonic and non-monotonic features. More specifically, it is assumed that the exemplary methods can partition a feature vector $x \in \mathbb{R}^S$ into $x=(p, q) \in \mathbb{R}^{S-\alpha} \times \mathbb{R}^{\alpha}$ such that $f(x)$ is monotonic on q.

A function $f(x)$ for x=(p, q) is partially monotonic on q if this inequality holds:

$$f(p, q) \le f(p, q'), \forall p, \forall q \le q'$$

where q≤q' denotes the inequality for all the elements (e.g., q[i]≤q'[i] for all 1≤i≤α). In this definition, the function $f(x)$ for x=(p, q) is said to be partially monotonic if $f(x)$ is non-decreasing with respect to q.

The partially monotonic regression has many applications in various fields. There are beneficial applications even for partially monotonic regression with α=1. An example of such application is the quantile regression, which is a method to estimate the conditional quantiles of a response variable distribution. As an input, a quantile level τ∈[0, 1] is given and a set of pairs $\{(x_1, y_1), (x_2, y_2), \ldots, (x_n, y_n)\}$ are provided where $x_i$ is a feature vector and $y_i$ is a real number.

Quantile regression is used to estimate the quantile value q(x, τ) for a new feature vector x defined by:

$$q(x, \tau) = inf\{y|F(y|X = x) \ge \tau\}$$

where F(y|X=x) is the conditional cumulative distribution function of Y given X=x:

$$F(y|X = x) = Pr(Y \le y|X = x)$$

Since the function q(x, τ) is monotonically increasing on t, this problem can be modeled as a partially monotonic regression with α=1.

Another example of the partially monotonic regression with α=1 is survival analysis in healthcare, or more generally time-to-event analysis. In survival analysis, a feature vector $x \in \mathbb{R}^m$ of a patient is given, and the time to an event of interest of this patient $t \in \mathbb{R}$. The event usually corresponds to a death of the patient. The task is to estimate a survival function S(x, t) for patient x, which represents the probability that the event does not occur until time t for patient x. Since the survival function S(x, t) is monotonically decreasing on t (e.g., S(x, 0)=1 at time t=0 and S(x, ∞)=0 at time t=∞), this problem can also be modeled as a partially monotonic regression with α=1 by setting $f(x, t)=1-S(p, t)$. The value $f(x, t)$ shows the mortality rate of patient x until time t, and $f(x, t)$ is monotonically increasing on t.

The exemplary embodiments construct a neural network for partially monotonic regression. The exemplary methods normalize each element of an S-dimensional input vector $x \in \mathbb{R}^S$ in the range [0, 1], because it is customary to do so when a neural network is employed. Therefore, the input space of the neural network can be represented as the S-dimensional unit hypercube $[0, 1]^S$.

The domination relationship between vertices of the unit hypercube is defined. Suppose that vertex v has a coordinate in $\mathbb{R}^{\alpha}$ and let v[d] be the value of d-th axis.

Regarding domination, a vertex $v \in \mathbb{R}^{\alpha}$ is said to dominate another vertex $u \in \mathbb{R}^{\alpha}$ if and only if u[d]≤v[d] holds for all d∈{1, 2, . . . , α} and there exists an index d'∈{1, 2, . . . , α} such that u[d']<v[d'].

Regarding a dominating set, given a vertex v and the ordering of vertices σ, $L_{v,\sigma}$ is used to denote the set of vertices which are dominated by v and precede v in σ.

Regarding a dominated set, given a vertex v and the ordering of vertices σ, $U_{v,\sigma}$ is used to denote the set of vertices which dominate v and precede v in σ.

The exemplary embodiments do not distinguish between a vertex v in a hypercube and its coordinate $x_v \in \mathbb{R}^{\alpha}$. This means that the value $f(x_v)$ of a function $f$ for input $x_v$ is sometimes written as $f(v)$.

Regarding the DLN, before illustrating the new neural network layer, the DLN is reviewed, which is a partially monotonic neural network. As noted above, DLN includes three types of layers, that is, the linear embedding layer, the lattice layer, and the calibration layer. The linear embedding layer is a simple extension of the standard linear layer in which non-negative weights are used to ensure monotonicity.

Figure 2:
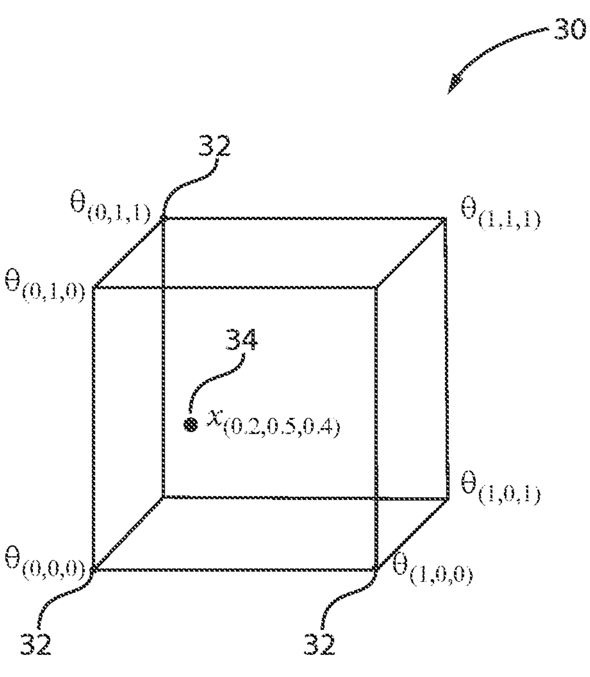
FIG. 2 illustrates an exemplary unit hypercube of the lattice layer of the DLN, in accordance with an embodiment of the present invention.

FIG. 2 illustrates an exemplary unit hypercube of the lattice layer of the DLN, in accordance with an embodiment of the present invention.

The unit hypercube 30 includes vertices 32 and an output value 34.

The lattice layer is a linearly interpolated multidimensional look-up table. The lattice layer receives an S-dimensional vector $x \in \mathbb{R}^S$ as an input and transforms it into a value $f(x) \in \mathbb{R}$. In this layer, the S-dimensional unit hypercube $[0, 1]^S$ is created. Let $V_S$ be the set of $2^S$ vertices of this unit hypercube. This layer has $2^S$ parameters $\theta \in \mathbb{R}^{2^S}$, specifying the lattice's output for each of the $2^S$ vertices of the unit hypercube. This means that $\theta_v=f(x_v)$ holds for all $v \in V_S$, where $x_v$ is the binary vector that corresponds to vertex $v \in V_S$ and $\theta_v$ is the parameter in θ that corresponds to vertex $v \in V_S$.

For an input x that does not correspond to any vertex $v \in V_S$ (e.g., x is an internal point of the unit hypercube), this layer computes $f(x)$ by using the multilinear interpolation of the parameters θ. More specifically, the exemplary methods compute:

$$\phi(x)[j] = \prod_{d=1}^{S} x[d]^{v_j[d]}(1 - x[d])^{1-v_j[d]},$$

where $v_j[\bullet] \in \{0,1\}$ is the coordinate vector of the j-th vertex of the unit hypercube and j=1, 2, . . . , $2^S$ and this layer outputs $f(x)=\varphi(x)^T \theta$.

For example, the output value for x=(0.3, 0.6) is computed by:

$$f(x) = \phi(x)^T\theta = (1-0.3)(1-0.6)\theta_{(0,0)} + (1-0.3)0.6\theta_{(0,1)} + 0.3(1-0.6)\theta_{(1,0)} + 0.3\cdot 0.6\theta_{(1,1)}.$$

The (partial) monotonicity of this layer is achieved by adding constraints to the training algorithm. This lattice layer outputs monotone function $f(x)$ if the parameter $\theta$ satisfies $\theta_v \le \theta_{v'}$ for all pair of vertices $(v, v') \in V_S \times V_S$ such that v dominates v'. This means that $f(x_{v'}) = \theta_{v'} \le \theta_v = f(x_v)$ holds for any $(v, v') \in V_S \times V_S$ such that v dominates v'. This constraint is not necessary for every pair of vertices in $V_S \times V_S$, but it is necessary for at least all the pairs of vertices in $E_S$, where $E_S$ is the set of the edges in the unit hypercube.

The size of $E_S$ is known to be equal to $|V_S| 2^{|V_S|-1}$. Once the constraints are satisfied for all pairs of vertices $(v, v') \in E_S$, the function $f(x)$ is guaranteed to be monotonic on x owing to the properties of the multilinear interpolation. In the lattice layer of DLN, these constraints on the pairs of vertices are added to the training algorithm of this layer.

Figure 3:
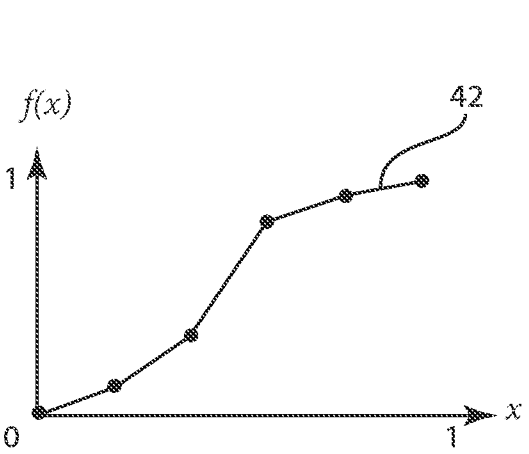
FIG. 3 illustrates an exemplary calibration layer of the DLN, in accordance with an embodiment of the present invention.

FIG. 3 illustrates an exemplary calibration layer of the DLN, in accordance with an embodiment of the present invention.

The graph 40 illustrates the calibration layer 42.

The calibration layer is the other layer in DLN that handles monotonicity constraints. Whereas the lattice layer is based on the multilinear interpolation, the calibration layer is designed to handle a non-linear function. This layer receives a value $x \in \mathbb{R}$ and outputs $f(x) \in \mathbb{R}$ by using a piece-wise linear transformation with k endpoints, where k is a hyperparameter. This layer learns the parameters of the piece-wise linear function $f$ and the parameterization of this layer is designed to satisfy the monotonicity constraint of $f(x)$ on x. This calibration layer is supposed to be combined with the lattice layer in DLN to handle non-linear relationship between an element of a feature vector and its output.

FIG. 4 illustrates an exemplary hypercube 50 for the non-linear lattice layer (2D), in accordance with an embodiment of the present invention.

The non-linear lattice layer receives an S-dimensional vector $x \in \mathbb{R}^S$ as an input and outputs $f(x) \in \mathbb{R}$, where the input x can be partitioned into two sub-vectors $p \in \mathbb{R}^{S-\alpha}$ and $q \in \mathbb{R}^{\alpha}$ such that $f(x)$ is monotonic on q.

Regarding the decomposed cube, in the non-linear lattice layer, the exemplary methods create the $\alpha$-dimensional unit hypercube (instead of the S-dimensional unit hypercube), and the exemplary methods further decompose it into $(k-1)\times(k-1)\times \ldots \times(k-1)$ sub-hypercubes by dividing the interval [0, 1] of each dimension into k−1 subintervals. Unless otherwise stated, it is assumed that the interval is divided into k−1 equal length intervals, which means that the length of an edge of a sub-hypercube is 1/(k−1). Thus $(k-1)^{\alpha}$ sub-hypercubes are created in the unit hypercube, and $k^{\alpha}$ vertices are created in the unit hypercube. FIG. 4 illustrates an example of the decomposed unit hypercube with $\alpha$=2 and k=4. $V\alpha$ is the $k^{\alpha}$ vertices in the decomposed unit hypercube.

Regarding the parameterization for monotonicity, in the original lattice layer in DLN, the parameters $\theta$ are stored explicitly (e.g., $\theta_v$ stores the value $f(x_v)$ for each $v \in V_S$). By contrast, the parameters of the non-linear lattice layer are stored as a neural network to compute a function $g_\theta(p, q)$ for input x=(p, q).

The function $g_\theta(p, q)$ is defined whose input is $(p, q) \in \mathbb{R}^{S-\alpha} \times \mathbb{R}^{\alpha}$ and output is $g_\theta(p, q) \in [0, 1]$. To define $g_\theta(p, q)$, the exemplary methods fix an arbitrary ordering $\sigma$ of the vertices in $V_\alpha$. Then for each vertex v in $\sigma$ and an input $p \in \mathbb{R}^{S-\alpha}$, let l(p, v) and u(p, v) be:

$$l(p, v) = \begin{cases} \max_{v' \in L_{v,\sigma}} f(p, v'), & \text{if } L_{v,\sigma} \neq \theta, \\ 0, & \text{if } L_{v,\sigma} = \theta, \end{cases}$$

$$u(p, v) = \begin{cases} \min_{v' \in U_{v,\sigma}} f(p, v'), & \text{if } U_{v,\sigma} \neq \theta, \\ 1, & \text{if } U_{v,\sigma} = \theta, \end{cases}$$

where $L_{v,\sigma}$ is the dominating set and $U_{v,\sigma}$ is the dominated set of v.

The function $g_\theta(p, v)$ is set to satisfy this equality:

$$f(p,v)=(1-g_\theta(p,v))l(p,v)+g_\theta(p,v)u(p,v).$$

In the non-linear lattice layer, a neural network $g_\theta(p, v)$ is stored, and the exemplary methods can compute $f(p, v)$ for any $p \in \mathbb{R}^{S-\alpha}$, and $v \in V_\alpha$ by using the neural network $g_\theta(p, v)$.

Regarding partial monotonicity, the non-linear lattice layer ensures the partial monotonicity. Suppose that a vertex ordering $\sigma=(v_1, v_2, \ldots, v_{16})$ is given as shown in FIG. 4. The exemplary methods first consider vertex $v_1$ in the left-bottom corner in FIG. 4. Since the exemplary methods have $L_{v1,\sigma}=U_{v1,\sigma}=\emptyset$ by definition, $l(p, v_1)=0$ and $u(p, v_1)=1$. Hence $g_\theta(p, v_1)=f(p, v_1)$ by definition. Next, vertex $v_2$ in the right-top corner in FIG. 4 is considered. Since the exemplary methods have $L_{v2,\sigma}=\{v_1\}$ and $U_{v2,\sigma}=\emptyset$ by definition, $l(p, v_2)=f(p, v_1)$ and $u(p, v_2)=1$. Hence $g_\theta(p, v_2)$ is set to satisfy $f(p, v_2)=(1-g_\theta(p, v_2))f(p, v_1)+g_\theta(p, v_2)$. Intuitively, l(p, v) and u(p, v) defined in Equations l(p, v) and u(p, v) above are lower and upper bounds of $f(p, v)$, respectively. Therefore, $g_\theta(p, v_2)$ corresponds to a relative position of $f(p, v_2)$ in the interval $[l(p, v_2), u(p, v_2)]$. This procedure is repeated until the end of $\sigma$.

An arbitrary vertex ordering $\sigma$ is used to ensure the monotonicity as shown in the following theorem. In such theorem, the partial monotonicity is guaranteed for any vertex ordering $\sigma$ in the non-linear lattice layer.

The proof of the theorem is as follows: suppose that the exemplary methods process i-th vertex v in the vertex ordering $\sigma$. By the definition of $L_{v,\sigma}$ and l(p, v), it is easy to see that $f(p, v_l) \le l(p, v)$ holds for any $p \in \mathbb{R}^{S-\alpha}$ and $v_l \in L_{v,\sigma}$. Similarly, by the definition of $U_{v,\sigma}$ and u(p, v), it is easy to see that $u(p, v) \le f(p, v_u)$ holds for any $p \in \mathbb{R}^{S-\alpha}$ and $v_u \in U_{v,\sigma}$. Therefore, it needs to be shown that $l(p, v) \le u(p, v)$ holds for any $(p, v) \in \mathbb{R}^{S-\alpha} \times \mathbb{R}^{\alpha}$. If this inequality holds, then $l(p, v) \le f(p, v) \le u(p, v)$ holds.

Now it is shown that $l(p, v) \leq u(p, v)$ holds for any $(p, v) \in \mathbb{R}^{S-\alpha} \times \mathbb{R}^{\alpha}$. Let $v_l$ be the vertex in $L_{v,\sigma}$ such that $l(p, v_l)=f(p, v_l)$ and let $v_u$ be the vertex in $U_{v,\sigma}$ such that $u(p, v_u)=f(p, v_u)$. Then $v_u$ dominates v and v dominates $v_l$ by definition, which means that $v_u$ dominates $v_l$. Now the goal is to show that $f(p, v_l) \leq f(p, v_u)$. If $v_u$ precedes $v_l$ in σ, then $v_u \in U_{vl,\sigma}$ and hence $f(p, v_l) \leq f(p, v_u)$ holds. Otherwise (e.g., if $v_l$ precedes $v_u$ in σ), then $v_l \in L_{vu,\sigma}$ and again $f(p, v_l) \leq f(p, v_u)$ holds.

Regarding heuristics for vertex ordering, although the monotonicity is ensured for any vertex ordering σ, a heuristic algorithm is provided to determine the vertex ordering σ, because the prediction performance of the non-linear lattice layer depends on the choice of the vertex ordering σ. First, the exemplary methods construct the graph $G=(V_\alpha, E_\alpha)$ that corresponds to the decomposed hypercube, where $V_\alpha$ is the set of the vertices in the decomposed hypercube and $E_\alpha$ is the set of the edges that connect the neighboring vertices in the decomposed sub-hypercubes.

Let d (v, v') for vertices $v, v' \in V_\alpha$ be the distance between vertices v and v' on G (e.g., the number of edges in the shortest path from v to v'). Let D be the shortest distance between these two vertices $v_0=(0, 0, \ldots, 0)$ and $v_1=(1, 1, \ldots, 1)$, which is known to be $D=\alpha(k-1)$. For each $d \in \{0, 1, 2, \ldots, D\}$, let $V_d$ be the set of vertices whose distance from $v_0=(0, 0, \ldots, 0)$ is exactly d. By this definition, $$\{V_d\}_{d=0}^{D}$$

is a partition of $V_\alpha$ (that is, $V_\alpha=V_0 \cup V_1 \cup \ldots \cup V_D$).

Then the exemplary methods generate a tree T by using Algorithm 1, reproduced below, with input $I=\{0, 1, \ldots, D\}$ and $\delta=(\delta_1, \delta_2, \ldots, \delta_D)$ being the level order traversal of T. It is noted that the result of the level order traversal of T starts with D/2, D/4, 3D/4, .... Then the vertex ordering σ is created, which follows the ordering $V\delta_1, V\delta_2, \ldots, V_{\delta D}$.

The computation results for the hypercube in FIG. 4 are:

$$V_0=\{v_1\}$$

$$V_1=\{v_7, v_8\}$$

$$V_2=\{v_{11}, v_{12}, v_{13}\}$$

$$V_3=\{v_3, v_4, v_5, v_6\}$$

$$V_4=\{v_{14}, v_{15}, v_{16}\}$$

$$V_5=\{v_9, v_{10}\}$$

$$V_6=\{v_2\}.$$

Then the result of level order traversal on the input is $I=\{0, 1, \ldots, 6\}$ is $\delta=(3, 1, 5, 0, 2, 4, 6)$. Hence the vertex ordering can be $\sigma=(v_3, v_4, v_5, v_6, v_7, v_8, v_9, v_{10}, v_1, v_{11}, v_{12}, v_{13}, v_{14}, v_{15}, v_{16}, v_2)$.

Algorithm 1 Gen-binary-tree(I)

```
Input: A set of integers I = {l, l + 1, l + 2, . . . , r] such that l ≤ r
Output: A tree T.
1: Choose a median as a pivot p = ⌊(l + r)/2⌋
2: If l < p − 1 then
3:     L = Gen-binary-tree({l, l + 1, l + 2, . . . , p − 1})
4: end if
5: if p + 1 < r then
```

-continued

Algorithm 1 Gen-binary-tree(I)

```
6:     R = Gen-binary-tree({p + 1, p + 2, . . . , r})
7: end if
8: return Node p with left child tree L and right child tree R
```

Regarding the relation with the original lattice layer in DLN, the non-linear lattice layer can be seen as a generalization of the calibration layer in DLN. By setting α=1, the non-linear lattice layer outputs $f(x_v)$ for any $v \in V_\alpha$ and the linear interpolation $f(x)$ of two values $f(x_{vl})$ and $f(x_{vr})$ for any $x_{vl} \leq x \leq x_{vr}$. Thus, the non-linear lattice layer with parameter k can output any monotone piecewise linear function $f(x)$ with k endpoints.

If S=α, then the non-linear lattice layer can be seen as a generalization of the lattice layer in DLN. By setting k=2 for the non-linear lattice layer, it outputs $f(x_v)$ for any $v \in V_\alpha$ and the multilinear interpolation $f(x)$ of two values $f(x_{vl})$ and $f(x_{vr})$ for any $x_{vl} \leq x \leq x_{vr}$. This is equivalent to the lattice layer in DLN.

FIG. 5 illustrates an exemplary method 80 to handle partial monotonicity, in accordance with an embodiment of the present invention.

The exemplary embodiments show how to handle partial monotonicity in the non-linear lattice layer. This is accomplished by dividing the input vector x into [p, q], where q corresponds to monotone features and p corresponds to non-monotone features. The dimension of the unit hypercube is set to the size of the monotone features q and the parameters θ of the non-linear lattice layers are estimated by a neural network whose input is p.

FIG. 6 illustrates an exemplary method for employing a non-linear lattice layer for a partially monotonic neural network, in accordance with an embodiment of the present invention.

At block 100, prepare parameters θ of the vertices, each of the parameters corresponding to each vertex of a subdivided unit hypercube which is defined by subdividing an α-dimensional unit hypercube by a predetermined number k with $k^\alpha$ vertices.

At block 102, the procedure to define the parameters includes:

Identifying one vertex in a specific order.

Identifying a first set of vertices that appear before the identified vertex in the specific order and are dominated by the identified vertex with regards to each coordinate of the identified vertex.

Identifying a second set of vertices that appear before the identified vertex in the specific order and are dominating the identified vertex with regards to each coordinate of the identified vertex.

Defining a lower bound as a maximum value among values of vertices in the first set.

Defining an upper bound as a minimum value among values of vertices in the second set.

Defining the parameter of the identified vertex based on the lower bound, upper bound and a parameter corresponding to the identified vertex so that the parameter represents a relative location of the identified vertex in an interval between the lower bound and the upper bound.

Repeating steps the above until all of the parameters of the vertices are defined.

FIG. 7 illustrates an exemplary method for employing a training algorithm, in accordance with an embodiment of the present invention.

At block 110, for each data point $(x_i, y_i)$ for i=1, 2, ..., n in the training dataset, perform the following operations:

Compute $y=f(x_i)$ by using the inference algorithm of the non-linear lattice layer.

Compute a loss function by using y (computed in the previous step) and $y_i$ (in the dataset).

Compute the gradient based on the loss and update the parameters $\theta_v$ based on the gradient.

Figure 8:
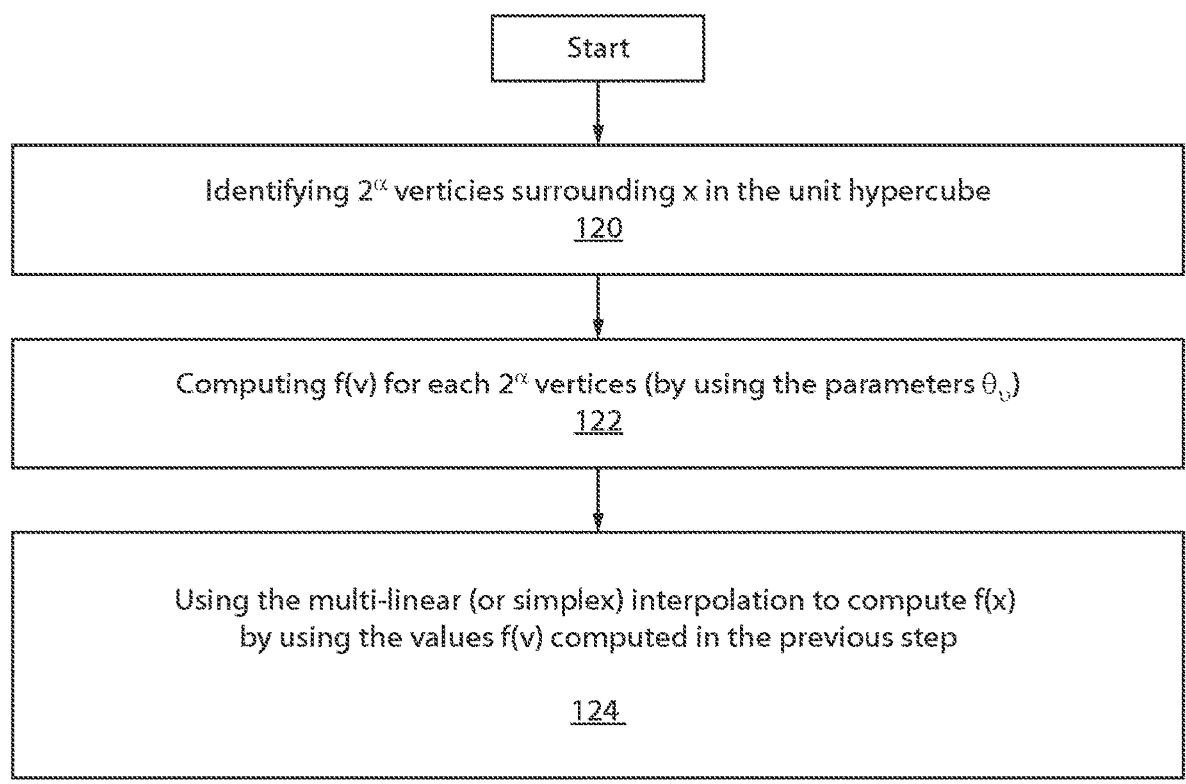
FIG. 8 illustrates an exemplary method for employing an inference algorithm, in accordance with an embodiment of the present invention.

FIG. 8 illustrates an exemplary method for employing an inference algorithm, in accordance with an embodiment of the present invention.

At block 120, identify $2^\alpha$ vertices surrounding x in the unit hypercube.

At block 122, compute f(v) for each $2^\alpha$ vertices (by using the parameters $\theta_v$).

At block 124, use the multi-linear (or simplex) interpolation to compute f(x) by using the values f(v) computed in the previous step.

In conclusion, a non-linear lattice layer for partially monotone neural networks is introduced as an extension of the lattice layer in DLN. An improvement over DLN is to change the size of the hypercube (e.g., the number of vertices) from $2^S$ to $k^\alpha$. Therefore, the new non-linear lattice layer is more effective than DLN for the case that k and $\alpha$ are small compared to S.

Figure 9:
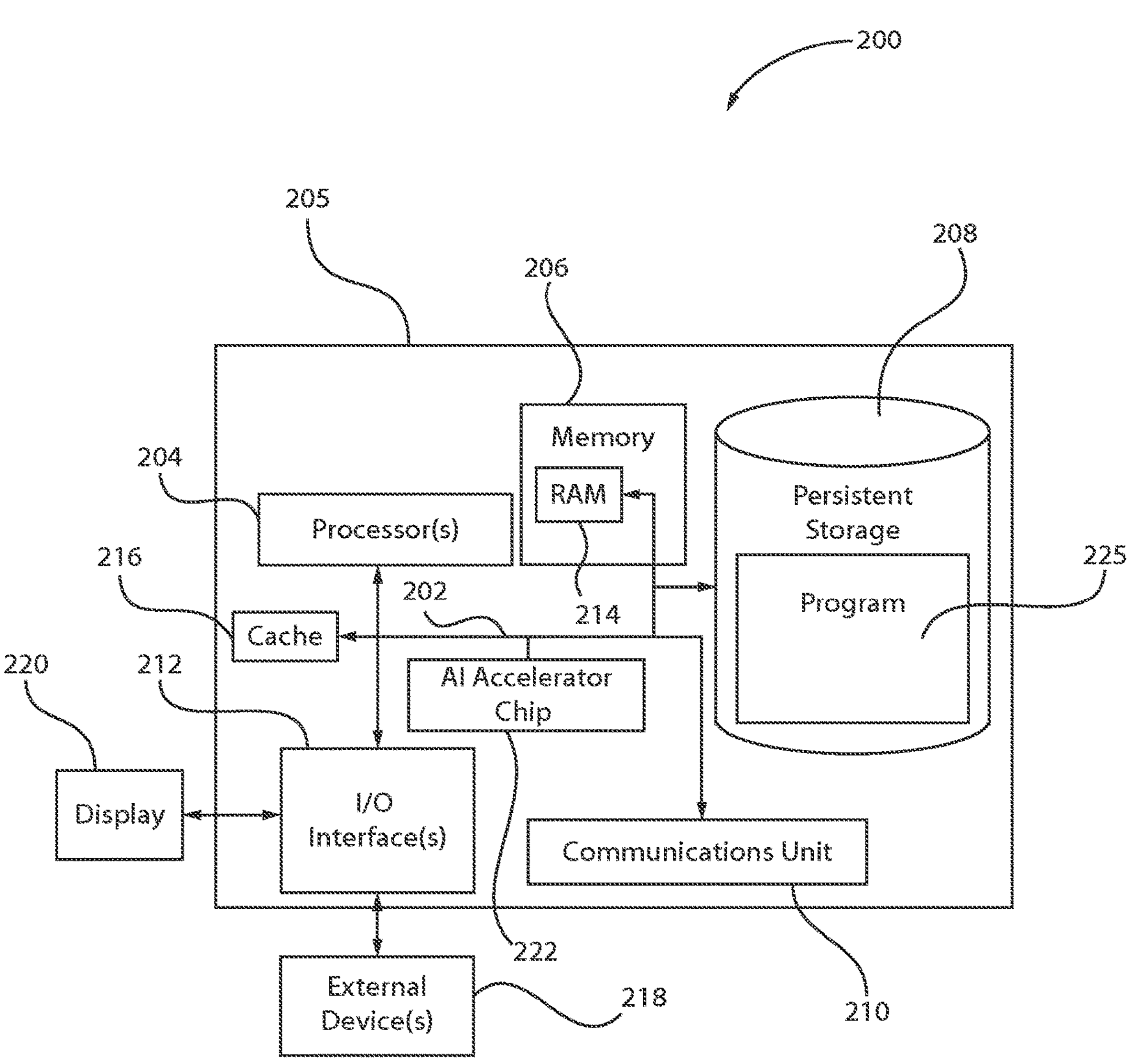
FIG. 9 is a block/flow diagram of an exemplary processing system for employing a non-linear lattice layer for a partially monotonic neural network, in accordance with an embodiment of the present invention.

FIG. 9 is a block/flow diagram of an exemplary processing system for employing a non-linear lattice layer for a partially monotonic neural network, in accordance with an embodiment of the present invention.

FIG. 9 depicts a block diagram of components of system 200, which includes computing device 205. It should be appreciated that FIG. 9 provides only an illustration of one implementation and does not imply any limitations with regard to the environments in which different embodiments can be implemented. Many modifications to the depicted environment can be made.

Computing device 205 includes communications fabric 202, which provides communications between computer processor(s) 204, memory 206, persistent storage 208, communications unit 210, and input/output (I/O) interface(s) 212. Communications fabric 202 can be implemented with any architecture designed for passing data and/or control information between processors (such as microprocessors, communications and network processors, etc.), system memory, peripheral devices, and any other hardware components within a system. For example, communications fabric 202 can be implemented with one or more buses.

Memory 206, cache memory 216, and persistent storage 208 are computer readable storage media. In this embodiment, memory 206 includes random access memory (RAM) 214. In another embodiment, the memory 206 can be flash memory. In general, memory 206 can include any suitable volatile or non-volatile computer readable storage media.

In some embodiments of the present invention, program 225 is included and operated by AI accelerator chip 222 as a component of computing device 205. In other embodiments, program 225 is stored in persistent storage 208 for execution by AI accelerator chip 222 (to implement a non-linear lattice layer for a partially monotonic neural network) in conjunction with one or more of the respective computer processors 204 via one or more memories of memory 206. In this embodiment, persistent storage 208 includes a magnetic hard disk drive. Alternatively, or in addition to a magnetic hard disk drive, persistent storage 208 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 208 can also be removable. For example, a removable hard drive can be used for persistent storage 208. Other examples include optical and magnetic disks, thumb drives, and smart cards that are inserted into a drive for transfer onto another computer readable storage medium that is also part of persistent storage 208.

Communications unit 210, in these examples, provides for communications with other data processing systems or devices, including resources of distributed data processing environment. In these examples, communications unit 210 includes one or more network interface cards. Communications unit 210 can provide communications through the use of either or both physical and wireless communications links. Deep learning program 225 can be downloaded to persistent storage 208 through communications unit 210.

I/O interface(s) 212 allows for input and output of data with other devices that can be connected to computing system 200. For example, I/O interface 212 can provide a connection to external devices 218 such as a keyboard, keypad, a touch screen, and/or some other suitable input device. External devices 218 can also include portable computer readable storage media such as, for example, thumb drives, portable optical or magnetic disks, and memory cards.

Display 220 provides a mechanism to display data to a user and can be, for example, a computer monitor.

Figure 10:
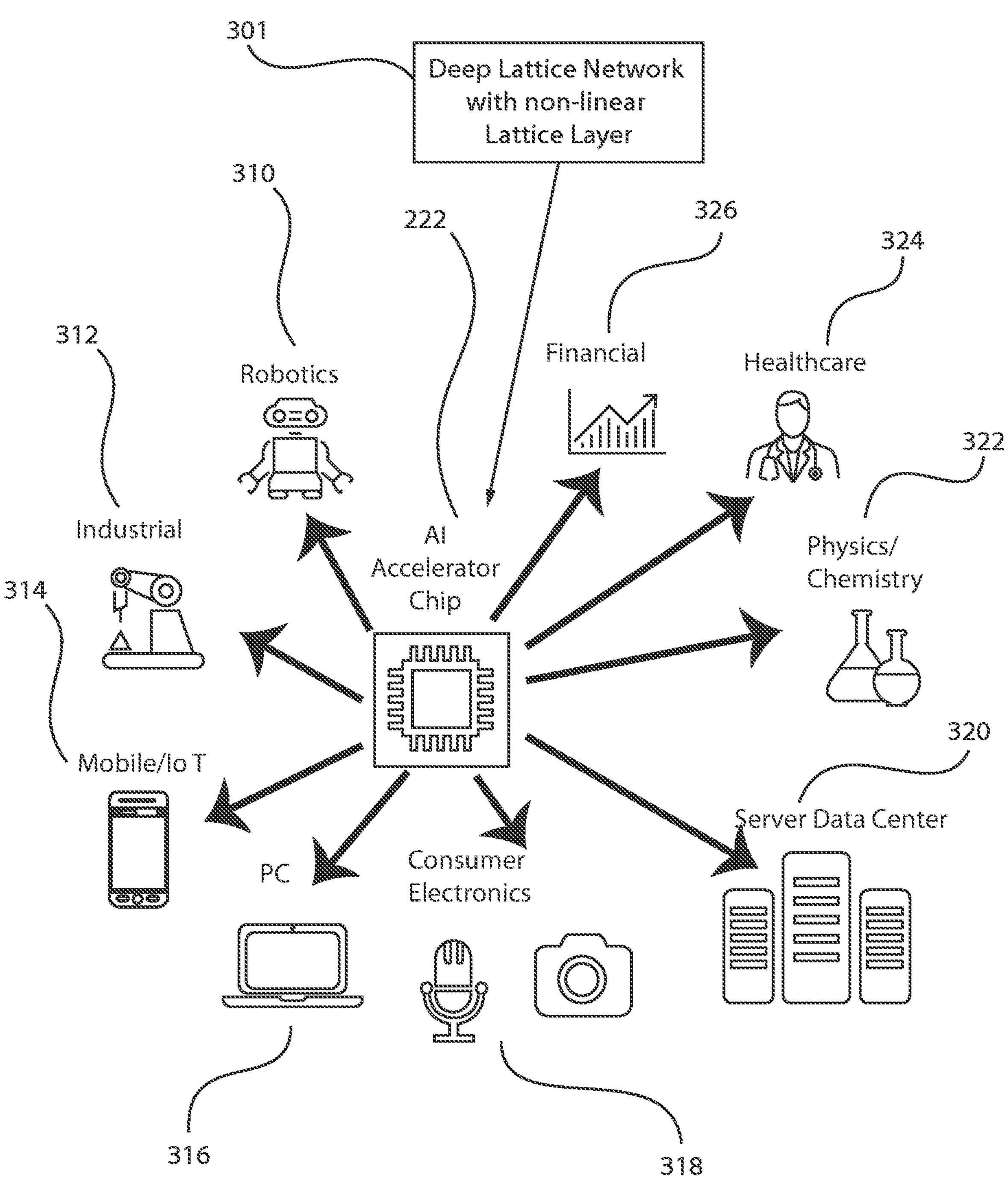
FIG. 10 illustrates practical applications for employing a non-linear lattice layer for a partially monotonic neural network via an artificial intelligence (AI) accelerator chip, in accordance with an embodiment of the present invention.

FIG. 10 illustrates practical applications for employing a non-linear lattice layer for a partially monotonic neural network via an artificial intelligence (AI) accelerator chip, in accordance with an embodiment of the present invention.

The artificial intelligence (AI) accelerator chip 222 can implement the non-linear lattice layer for a partially monotonic neural network 301, and can be used in a wide variety of practical applications, including, but not limited to, robotics 310, industrial applications 312, mobile or Internet-of-Things (IoT) 314, personal computing 316, consumer electronics 318, server data centers 320, physics and chemistry applications 322, healthcare applications 324, and financial applications 326.

Figure 11:
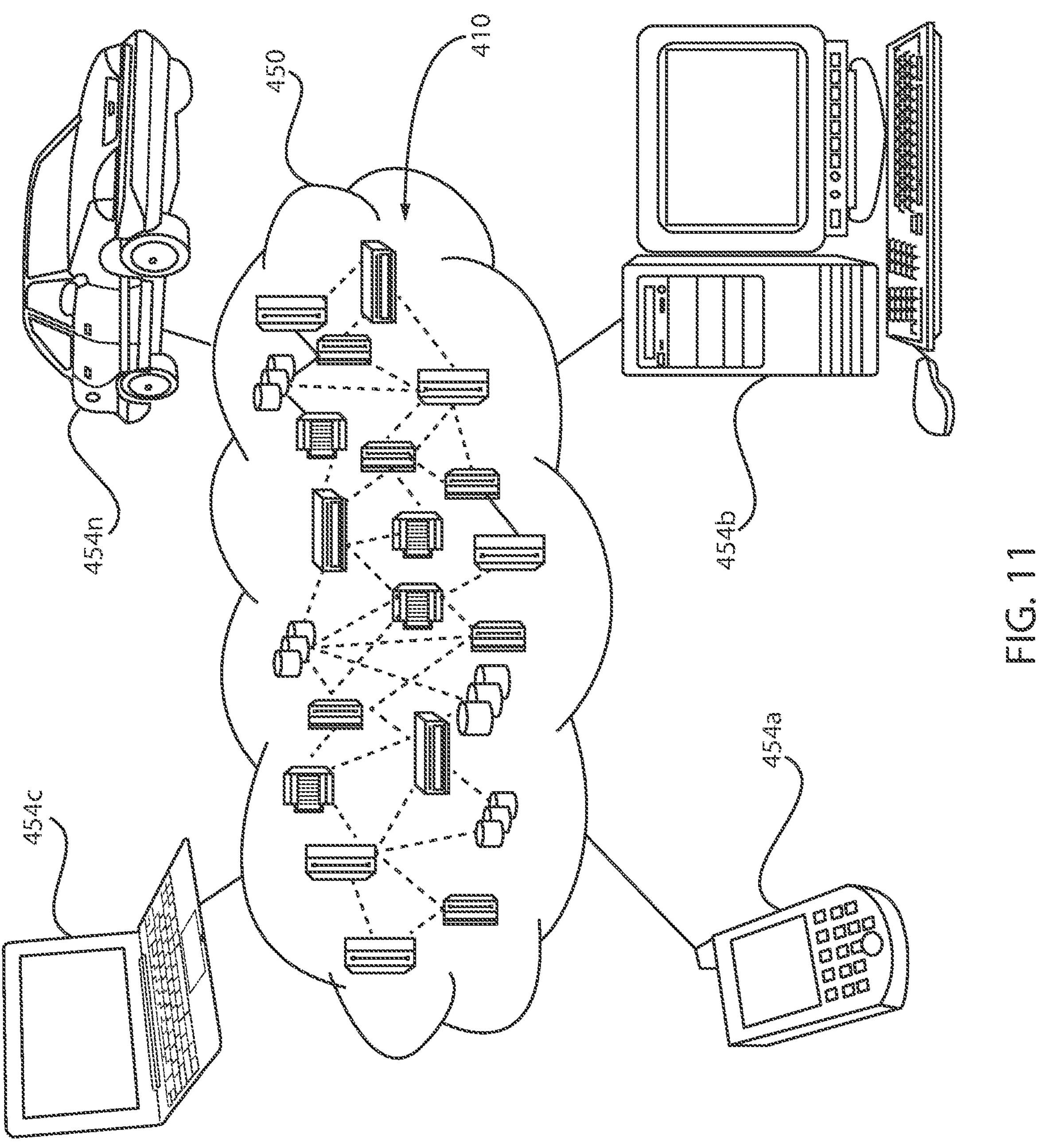
FIG. 11 is a block/flow diagram of an exemplary cloud computing environment, in accordance with an embodiment of the present invention.

FIG. 11 is a block/flow diagram of an exemplary cloud computing environment, in accordance with an embodiment of the present invention.

It is to be understood that although this invention includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model can include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but can be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (Saas): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It can be managed by the organization or a third party and can exist on-premises or off-premises.

Community cloud: the cloud infrastructure is shared by several organizations and supports a specific community that has shared concerns (e.g., mission, security requirements, policy, and compliance considerations). It can be managed by the organizations or a third party and can exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 11, illustrative cloud computing environment 450 is depicted for enabling use cases of the present invention. As shown, cloud computing environment 450 includes one or more cloud computing nodes 410 with which local computing devices used by cloud consumers, such as, for example, personal digital assistant (PDA) or cellular telephone 454A, desktop computer 454B, laptop computer 454C, and/or automobile computer system 454N can communicate. Nodes 410 can communicate with one another. They can be grouped (not shown) physically or virtually, in one or more networks, such as Private, Community, Public, or Hybrid clouds as described hereinabove, or a combination thereof. This allows cloud computing environment 450 to offer infrastructure, platforms and/or software as services for which a cloud consumer does not need to maintain resources on a local computing device. It is understood that the types of computing devices 454A-N shown in FIG. 11 are intended to be illustrative only and that computing nodes 410 and cloud computing environment 450 can communicate with any type of computerized device over any type of network and/or network addressable connection (e.g., using a web browser).

Figure 12:
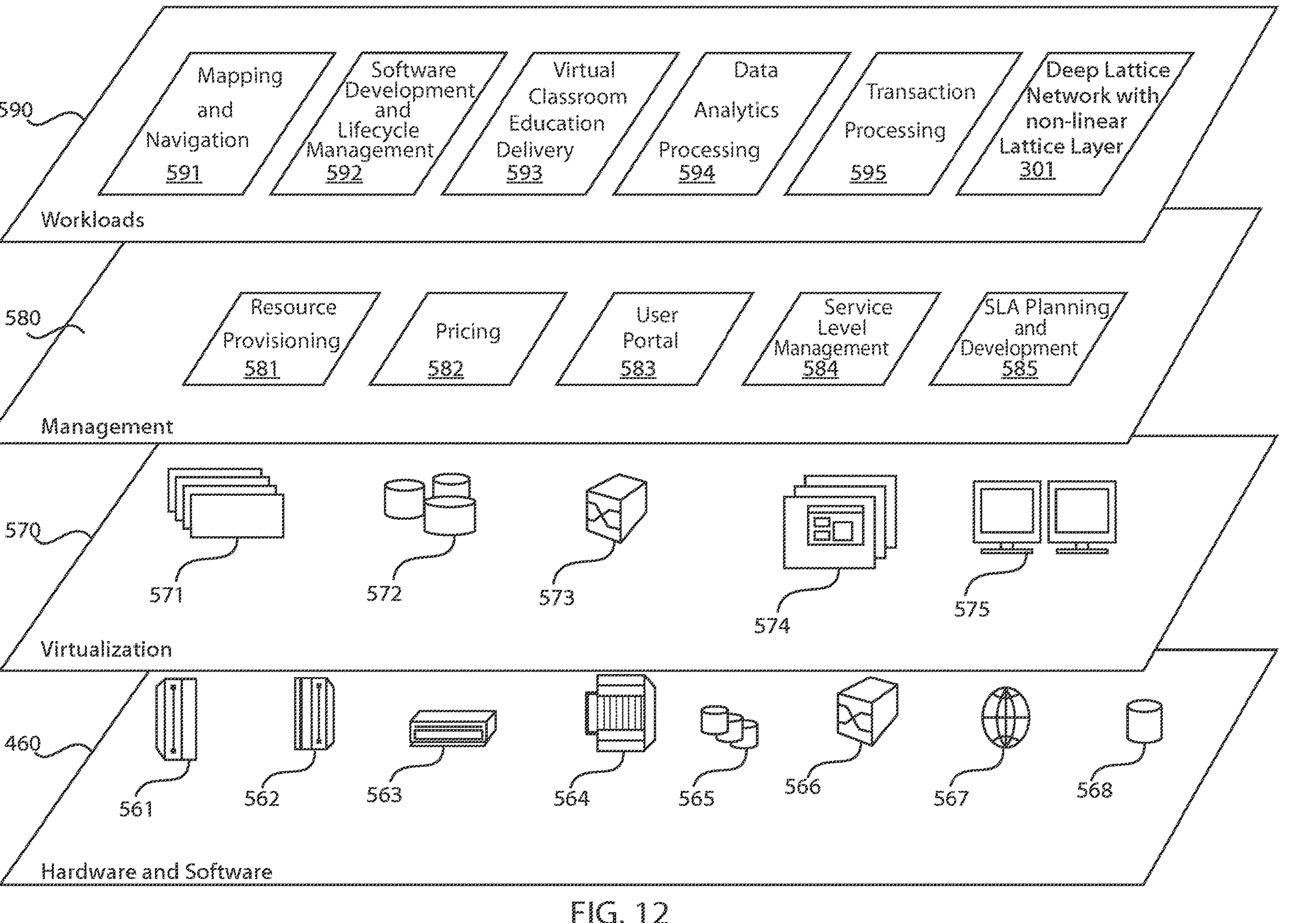
FIG. 12 is a schematic diagram of exemplary abstraction model layers, in accordance with an embodiment of the present invention.

FIG. 12 is a schematic diagram of exemplary abstraction model layers, in accordance with an embodiment of the present invention. It should be understood in advance that the components, layers, and functions shown in FIG. 12 are intended to be illustrative only and embodiments of the invention are not limited thereto. As depicted, the following layers and corresponding functions are provided:

Hardware and software layer 560 includes hardware and software components. Examples of hardware components include: mainframes 561; RISC (Reduced Instruction Set Computer) architecture based servers 562; servers 563; blade servers 564; storage devices 565; and networks and networking components 566. In some embodiments, software components include network application server software 567 and database software 568.

Virtualization layer 570 provides an abstraction layer from which the following examples of virtual entities can be provided: virtual servers 571; virtual storage 572; virtual networks 573, including virtual private networks; virtual applications and operating systems 574; and virtual clients 575.

In one example, management layer 580 can provide the functions described below. Resource provisioning 581 provides dynamic procurement of computing resources and other resources that are utilized to perform tasks within the cloud computing environment. Metering and Pricing 582 provide cost tracking as resources are utilized within the cloud computing environment, and billing or invoicing for consumption of these resources. In one example, these resources can include application software licenses. Security provides identity verification for cloud consumers and tasks, as well as protection for data and other resources. User portal 583 provides access to the cloud computing environment for consumers and system administrators. Service level management 584 provides cloud computing resource allocation and management such that required service levels are met. Service Level Agreement (SLA) planning and fulfillment 585 provide pre-arrangement for, and procurement of, cloud computing resources for which a future requirement is anticipated in accordance with an SLA.

Workloads layer 590 provides examples of functionality for which the cloud computing environment can be utilized. Examples of workloads and functions which can be provided from this layer include: mapping and navigation 541; software development and lifecycle management 592; virtual classroom education delivery 593; data analytics processing 594; transaction processing 595; and a non-linear lattice layer for a partially monotonic neural network 301.

The present invention can be a system, a method, and/or a computer program product. The computer program product can include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory, a read-only memory, an erasable programmable read-only memory (EPROM or Flash memory), a static random access memory, a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions can be provided to at least one processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks or modules. These computer readable program instructions can also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks or modules.

The computer readable program instructions can also be loaded onto a computer, other programmable data processing apparatus, or other device to cause a series of operational blocks/steps to be performed on the computer, other programmable apparatus or other device to produce a computer implemented process, such that the instructions which execute on the computer, other programmable apparatus, or other device implement the functions/acts specified in the flowchart and/or block diagram block or blocks or modules.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which includes one or more executable instructions for implementing the specified logical function(s). In some alternative implementations, the functions noted in the blocks can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

It is to be appreciated that the use of any of the following "\", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This can be extended, as readily apparent by one of ordinary skill in this and related arts, for as many items listed.

Having described preferred embodiments of a method for employing a non-linear lattice layer for a partially monotonic neural network (which are intended to be illustrative and not limiting), it is noted that modifications and variations can be made by persons skilled in the art in light of the above teachings. It is therefore to be understood that changes may be made in the particular embodiments described which are within the scope of the invention as outlined by the appended claims. Having thus described aspects of the invention, with the details and particularity required by the patent laws, what is claimed and desired protected by Letters Patent is set forth in the appended claims.

The invention claimed is:

1. A computer-implemented method for training a lattice layer in a Deep Lattice Network (DLN) to infer a real-value output from an S-dimensional input having a monotonic-relationship with the real-value output, the computer-implemented method comprising:

generating a partially monotonic regression model to avoid unfair scoring by configuring the DLN with a non-linear lattice layer having extended hypercubes by;

preparing parameters θ of vertices, each of the parameters corresponding to each vertex of a subdivided unit hypercube defined by subdividing an S-dimensional unit hypercube by a predetermined number k with $k^S$ vertices; and defining each parameter θ, of the parameters by:

identifying a vertex, of the vertices, in a specific order;

identifying a first set of vertices, of the vertices, that appear before the identified vertex in the specific order and are dominated by the identified vertex with regards to each coordinate of the identified vertex;

identifying a second set of vertices, of the vertices, that appear before the identified vertex in the specific order and are dominating the identified vertex with regards to each coordinate of the identified vertex;

defining a lower bound as a maximum value among values of vertices in the first set of vertices;

defining an upper bound as a minimum value among values of vertices in the second set of vertices; and defining the parameter of the identified vertex based on the lower bound and the upper bound so that the parameter represents a relative location of the identified vertex in an interval between the lower bound and the upper bound, wherein the hypercubes are extended by a number of vertices from $2^S$ to $k^S$, when k is less than S, to increase DLN granularity.

2. The computer-implemented method of claim 1, wherein the lower bound is computed by: $l=\max\{0, \max_{v' \in L_{v,\sigma}} f(v')\}$, where v is a vertex and $L_{v,\sigma}$ is the first set of vertices.

3. The computer-implemented method of claim 2, wherein the upper bound is computed by: $u=\min\{0, \min_{v' \in U_{v,\sigma}} f(v')\}$, where v is a vertex and $U_{v,\sigma}$ is the second set of vertices.

4. The computer-implemented method of claim 3, wherein the parameter θ is defined to a value that satisfies: $f(v)=(1-\theta_v)\ l+\theta_v\ u$.

5. The computer-implemented method of claim 1, wherein a dimension of the S-dimensional unit hypercube is changed from S to α and the parameters θ are stored as a neural network to compute a function $g_\theta(p, q)$ for input x=(p, q), where the function $g_\theta(p, q)$ is defined by fixing an arbitrary ordering σ of the vertices.

6. The computer-implemented method of claim 5, wherein the first set of vertices are a dominating set of vertices and the second set of vertices are a dominated set of vertices.

7. The computer-implemented method of claim 5, wherein the arbitrary ordering of the vertices is determined by constructing a graph G=(V,E) that corresponds to a decomposed hypercube, where V is a set of vertices in the decomposed hypercube and E is a set of edges that connect neighboring vertices in decomposed sub-hypercubes.

8. A computer program product for training a lattice layer in a Deep Lattice Network (DLN) to infer a real-value output from an S-dimensional input having a monotonic-relationship with the real-value output, the computer program product comprising a computer readable storage medium having program instructions embodied therewith, the program instructions executable by a computer to cause the computer to:

generating a partially monotonic regression model to avoid unfair scoring by configure the DLN with a non-linear lattice layer having extended hypercubes, the program instructions further cause the computer to:

prepare parameters θ of vertices, each of the parameters corresponding to each vertex of a subdivided unit hypercube defined by subdividing an S-dimensional unit hypercube by a predetermined number k with $k^S$ vertices; and define each parameter θ, of the parameters by:

identifying a vertex, of the vertices in a specific order;

identifying a first set of vertices, of the vertices, that appear before the identified vertex in the specific order and are dominated by the identified vertex with regards to each coordinate of the identified vertex;

identifying a second set of vertices, of the vertices, that appear before the identified vertex in the specific order and are dominating the identified vertex with regards to each coordinate of the identified vertex;

defining a lower bound as a maximum value among values of vertices in the first set of vertices;

defining an upper bound as a minimum value among values of vertices in the second set of vertices; and defining the parameter of the identified vertex based on the lower bound and the upper bound so that the parameter represents a relative location of the identified vertex in an interval between the lower bound and the upper bound, wherein the hypercubes are extended by a number of vertices from $2^S$ to $k^S$, when k is less than S, to increase DLN granularity.

9. The computer program product of claim 8, wherein the lower bound is computed by: $l=\max\{0, \max_{v' \in L_{v,\sigma}} f(v')\}$, where v is a vertex and $L_{v,\sigma}$ is the first set of vertices.

10. The computer program product of claim 9, wherein the upper bound is computed by: $u=\min\{0, \min_{v' \in U_{v,\sigma}} f(v)\}$, where v is a vertex and $U_{v,\sigma}$ is the second set of vertices.

11. The computer program product of claim 10, wherein the parameter θ is defined to a value that satisfies: $f(v)=(1-\theta_v)\ 1+\theta_v\ u$.

12. The computer program product of claim 8, wherein a dimension of the S-dimensional unit hypercube is changed from S to α and the parameters θ are stored as a neural network to compute a function $g_\theta(p, q)$ for input x=(p, q), where the function $g_\theta(p, q)$ is defined by fixing an arbitrary ordering σ of the vertices.

13. The computer program product of claim 12, wherein the first set of vertices are a dominating set of vertices and the second set of vertices are a dominated set of vertices.

14. The computer program product of claim 12, wherein the arbitrary ordering of the vertices is determined by constructing a graph G=(V,E) that corresponds to a decomposed hypercube, where V is a set of vertices in the decomposed hypercube and E is a set of edges that connect neighboring vertices in decomposed sub-hypercubes.

15. A system for training a lattice layer in a Deep Lattice Network (DLN) to infer a real-value output from an S-dimensional input having a monotonic-relationship with the real-value output, the system comprising:

a memory; and one or more processors in communication with the memory configured to:

generating a partially monotonic regression model to avoid unfair scoring by configuring the DLN with a non-linear lattice layer having extended hypercubes, which further causes the one or more processors to;

prepare parameters θ0 of vertices, each of the parameters corresponding to each vertex of a subdivided unit hypercube defined by subdividing an S-dimensional unit hypercube by a predetermined number k with $k^S$ vertices; and define each parameter θ, of the parameters by:

identifying a vertex, of the vertices, in a specific order;

identifying a first set of vertices, of the vertices, that appear before the identified vertex in the specific order and are dominated by the identified vertex with regards to each coordinate of the identified vertex;

identifying a second set of vertices, of the vertices, that appear before the identified vertex in the specific order and are dominating the identified vertex with regards to each coordinate of the identified vertex;

defining a lower bound as a maximum value among values of vertices in the first set of vertices;

defining an upper bound as a minimum value among values of vertices in the second set of vertices; and defining the parameter of the identified vertex based on the lower bound and the upper bound so that the parameter represents a relative location of the identified vertex in an interval between the lower bound and the upper bound, wherein the hypercubes are extended by a number of vertices from $2^S$ to $k^S$, when k is less than S, to increase DLN granularity.

16. The system of claim 15, wherein the lower bound is computed by: $l=\max\{0, \max_{v' \in L_{v,\sigma}} f(v)\}$, where v is a vertex and $L_{v,\sigma}$ is the first set of vertices.

17. The system of claim 16, wherein the upper bound is computed by: $u=\min\{0, \min_{v' \in U_{v,\sigma}} f(v')\}$, where v is a vertex and $U_{v,\sigma}$ is the second set of vertices.

18. The system of claim 17, wherein the parameter θ is defined to a value that satisfies: $f(v)=(1-\theta_v)\ 1+\theta_v\ u$.

19. The system of claim 15, wherein a dimension of the S-dimensional unit hypercube is changed from S to α and the parameters θ are stored as a neural network to compute a function $g_\theta(p, q)$ for input x=(p, q), where the function $g_\theta(p, q)$ is defined by fixing an arbitrary ordering σ of the vertices.

20. The system of claim 19, wherein the arbitrary ordering of the vertices is determined by constructing a graph G=(V, E) that corresponds to a decomposed hypercube, where V is a set of vertices in the decomposed hypercube and E is a set of edges that connect neighboring vertices in decomposed sub-hypercubes.

21. A computer-implemented method for training a lattice layer in a Deep Lattice Network (DLN), the computer-implemented method comprising:

generating a partially monotonic regression model to avoid unfair scoring by creating a non-linear lattice layer for the DLN, the non-linear lattice layer including an α-dimensional unit hypercube decomposed into (k−1)×(k−1)× . . . ×(k−1) sub-hypercubes by dividing an interval [0, 1] of each dimension into k−1 subintervals, wherein a dimension of the α-dimensional unit hypercube is changed from S to α, to increase DLN granularity;

preparing parameters θ of vertices, each of the parameters corresponding to each vertex of the α-dimensional unit hypercube, the vertices being arbitrarily ordered, a parameter θ, of the parameters is defined to a value that satisfies: $f(v)=(1-\theta_v)\ 1+\theta_v,\ u$, where v is a vertex and u is an upper bound; and generating a monotone piecewise linear function $f(x)$ with k endpoints.

22. The computer-implemented method of claim 21, wherein the parameters θ are stored as a neural network to compute a function $g_\theta(p, q)$ for input x=(p, q), where the function $g_\theta(p, q)$ is defined by fixing an arbitrary ordering σ of the vertices.

23. The computer-implemented method of claim 22, wherein the arbitrary ordering of the vertices is determined by constructing a graph G=(V,E) that corresponds to a decomposed hypercube, where V is a set of vertices in the decomposed hypercube and E is a set of edges that connect neighboring vertices in decomposed sub-hypercubes.

24. A computer program product for training a lattice layer in a Deep Lattice Network (DLN), the computer program product comprising a computer readable storage medium having program instructions embodied therewith, the program instructions executable by a computer to cause the computer to:

generate a partially monotonic regression model to avoid unfair scoring to create a non-linear lattice layer for the DLN, the non-linear lattice layer including an $\alpha$-dimensional unit hypercube decomposed into $(k-1)\times(k-1)\times \ldots \times(k-1)$ sub-hypercubes by dividing an interval [0, 1] of each dimension into $k-1$ subintervals, wherein dimension of the hypercube is changed from S to $\alpha$, to increase DLN granularity;

prepare parameters $\theta$ of vertices, each of the parameters corresponding to each vertex of the $\alpha$-dimensional unit hypercube, a parameter $\theta$ is defined to a value that satisfies: $f(v)=(1-\theta_v)\ 1+\theta_v\ u$, where v is a vertex and u is an upper bound; and generate a monotone piecewise linear function $f(x)$ with k endpoints.

25. The computer program product of claim 24, wherein the parameters $\theta$ are stored as a neural network to compute a function $g_\theta(p, q)$ for input $x=(p, q)$, where the function $g_\theta(p, q)$ is defined by fixing an arbitrary ordering $\sigma$ of the vertices.

* * * * *